Jan. 6, 1959 C. P. SPAULDING 2,867,723
ELECTRONIC SWITCHING APPARATUS
Filed May 17, 1954

INVENTOR.
CARL P. SPAULDING
BY James B. Christie
ATTORNEY

United States Patent Office 2,867,723

Patented Jan. 6, 1959

2,867,723

ELECTRONIC SWITCHING APPARATUS

Carl P. Spaulding, Pasadena, Calif., assignor, by mesne assignments, to Consolidated Electrodynamic Corporation, Pasadena, Calif., a corporation of California Application May 17, 1954, Serial No. 430,049

2 Claims. (Cl. 250—27)

This invention relates to high speed switching apparatus for selectively coupling any one of a plurality of input circuits to an output circuit.

Mechanical relays are ordinarily employed in order to select one of two or more signal inputs and provide an output signal which is substantially equal to the signal of the selected input. Such relays are not capable of extremely high speed operation because a finite time is required to move the mass of the armature of the relay. I have discovered that electronic switching apparatus can be arranged to accomplish a switching action which is substantially the same as that achieved by a mechanical relay but without the limitations of speed of operation which are characteristic of mechanical relays.

In accordance with my invention, I provide two or more amplifiers having separate input circuits and a common output circuit, with negative feedback being provided between the common output circuit and the respective input circuits for the amplifiers. The respect amplifiers are activated and de-activated electronically by control potentials or switching signals, and the apparatus is arranged so that only one amplifier is activated at a time.

The magnitude of the signal which is produced at the common output circuit is determined by the magnitude of the signal which is applied to the input circuit of the amplifier which is activated.

In order to provide a switching action which is similar to that of a mechanical relay, I provide 100% negative feedback so that the signal which is produced at the common output circuit is equal to the signal which is applied to the input circuit of the amplifier which is activated. Such feedback may be obtained by arranging the feedback circuits so that the series resistance of the feedback circuit between the output circuit and the respective inputs for the amplifiers is substantially equal to the series resistance of the respective input circuits. With such an arrangement, an accuracy of 0.1% or better can be obtained so that the electronic switching apparatus is as accurate as a mechanical relay. The circuit can be arranged to have a very low source impedance.

In addition to the advantage of extremely high speed operation, the switching apparatus of my invention also has the advantage that the switching signals are applied to electronic apparatus rather than to the coil of a relay; hence, very little power is required in comparison to the power required to operate a relay.

Thus, the switching apparatus of my invention is the electronic equivalent of a mechanical relay, and it has several advantages over a mechanical relay.

The invention is explained with reference to the drawings, in which.

Figure 1:
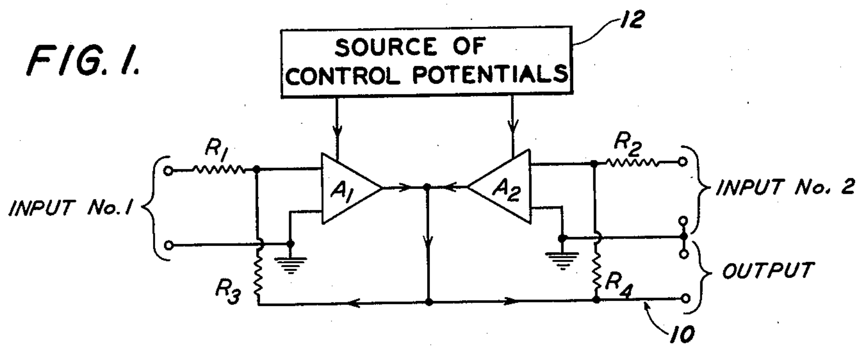
Fig. 1 is a simplified diagram of one embodiment of the invention.

The apparatus of Fig. 1 is an arrangement for providing an output signal which is equal to either of two input signals.

A pair of amplifiers A1, A2 are provided with separate input circuits and with a common output circuit 10. A source 12 of control potentials serves to activate one of the amplifiers and to deactivate the other amplifier, so that only one amplifier is activated at a time.

Two resistors R1 and R2 are connected in series in the respective input circuits for the two amplifiers. Negative feedback is provided by two resistors R3 and R4 which are connected between the common output circuit and the respective inputs for the amplifiers.

Preferably 100% negative feedback is employed so as to provide a gain of 1 between the input and output circuits. This is achieved by making the series resistance of the feedback circuits for the respective amplifiers equal to the series resistance of the input circuits for the respective amplifiers. Hence, it is preferable that R1, R2, R3 and R4 be of equal resistance. If an even number of stages is employed in each amplifier section so that a positive signal input will produce a negative signal output, the output voltage produced by the activated amplifier is as follows:

$$E\text{ out} = -E\text{ in}\left(\frac{A}{A+2}\right)$$

If A, the amplification of the amplifier, is large the output signal is substantially equal to the input signal, and the variation can be limited to less than 0.1%.

In operation, two different input signals may be applied to the two input circuits, and the output signal is equal to the signal which is applied to the amplifier which is activated. The respective amplifiers may be activated and de-activated at a very high speed by the source of control potentials so as to shift from one input to the other or so as to shift back and forth between the two input circuits.

Figure 2:
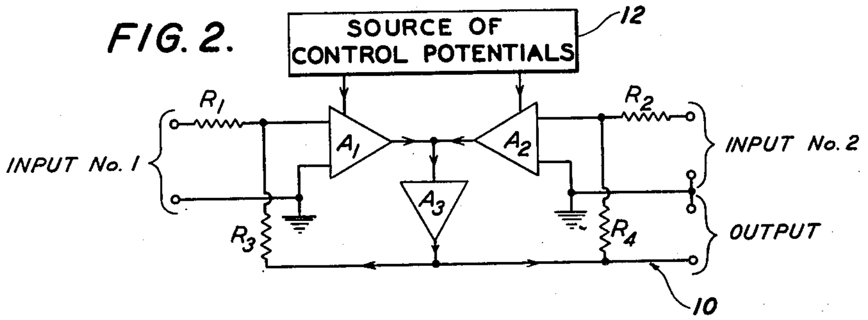
Fig. 2 is a simplified diagram of another embodiment of the invention.

The apparatus of Fig. 2 is the same as that disclosed in Fig. 1, except that an additional amplifier A3 has been provided in the common output circuit of the amplifiers A1 and A2. The arrangement of Fig. 2 has the advantage that fewer tubes are required in the three amplifiers than are required in the two amplifiers which are employed in the embodiment of Fig. 1, due to the fact that the amplifier A3 amplifies the signal which is produced by either of the other two amplifiers.

Figure 3:
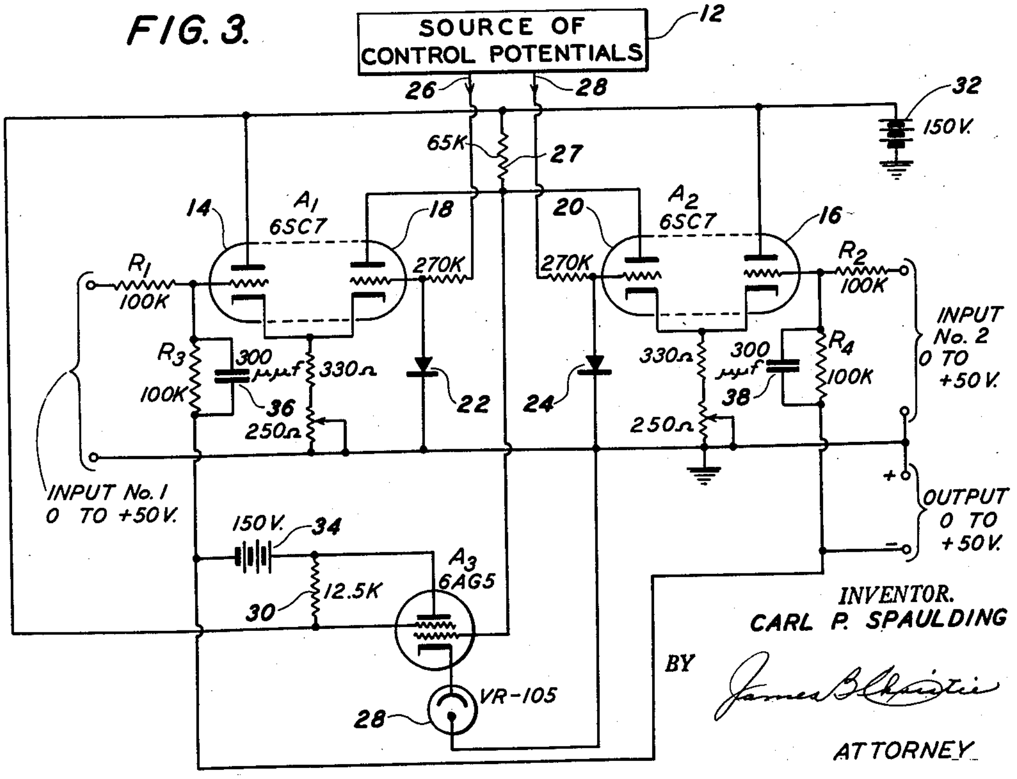
Fig. 3 is a schematic diagram of a circuit of the type illustrated in Fig. 2.

Fig. 3 is a schematic diagram with circuit constants showing one practical embodiment of the apparatus of Fig. 2. The three amplifiers are D. C. coupled, with the two 6SC7 tubes constituting the amplifiers A1 and A2 and the 6AG5 tube constituting the amplifier A3.

The two input circuits are coupled to the twin triode sections 14, 16 of the 6SC7 tubes, and the other twin triode sections 18, 20 serve as amplifiers which are activated and de-activated by the source 12 of control potentials.

A pair of diodes 22, 24 are connected between the control grids of the triode sections 18 and 20 and ground. One of these diodes provides a low impedance to ground when a positive potential is applied between the control grid of one of the tubes and ground, and the other diode provides a high impedance to ground when a negative potential is applied between the control grid of the other tube and ground.

The source 12 of control potentials provides a slightly positive potential on one lead of its output leads 26, 28, and it provides a negative potential of at least 20 volts on the other output lead. The source 12 may be a conventional arrangement for providing switching or gating potentials. By way of example, it may be a multivibrator with each of the output leads 26, 28 being coupled to different sections of the multivibrator and arranged to provide the desired potentials. It may be a bi-stable multivibrator arranged to maintain the desired potentials on its respective output leads for an indefinite period of time, or it may be a free running multivibrator if it is desired to switch between the two input circuits alternately at a fixed rate.

The output lead of the source 12 which is at slightly positive potential serves to activate the amplifier to which it is connected, and the other lead which is at negative potential serves to deactivate the other amplifier section.

A resistor 27 serves as a common load resistor for the two amplifier sections A1 and A2, and the signal which is developed across the common load resistor is applied to the control grid of the 6AG5 tube. A voltage regulator tube 28 is connected in the cathode circuit of the 6AG5 tube to provide a proper voltage level for the D. C. coupling arrangement. The 6AG5 tube develops an output signal across its load resistor 30, and this signal is applied to the output terminals of the switching arrangement.

A source of potential 32 provides the operating potentials for all of the amplifier tubes, and a source of potential 34 maintains the output circuit at a proper level for the D. C. coupling arrangement. These sources of potential are coupled to the output terminals so that the potentials provided by the sources cancel out, and hence the signal developed across the load resistor 30 is applied directly to the output terminals. These sources of potential should provide exactly the same potentials in order to produce an accurate output signal. Since the source 32 provides current for the amplifier tubes, it should be well regulated.

A pair of condensers 36, 38 are connected across the two feedback resistors R3 and R4 so as to permit high speed operation of the switching apparatus without developing undesired transients.

In order to illustrate the operation of the apparatus of Fig. 3, assume that a signal of 50 volts is applied to the input circuit No. 1 and that no voltage is applied to the input circuit No. 2. If the source of control potentials provides a slightly positive potential on the lead 26 and a negative potential on the lead 28, the amplifier A1 will be activated and the amplifier A2 will be de-activated. Section 14 of amplifier A1 conducts in response to the 50 volt signal at the input No. 1. Since sections 14 and 18 are coupled by a common cathode circuit, conduction in section 14 increases the bias on section 18 to control the conduction of section 18 which causes a low voltage drop to be produced across the common load resistor 27, and thus causes a high potential to be applied to the control grid of the amplifier A3. The voltage on the grid of amplifier A3 produces a voltage drop of 50 volts across the load resistor 30. The signal voltage across the load resistor 30 is coupled to the output terminals with the output signal being negative with respect to ground.

If the source of control potentials is now switched so that the lead 26 is negative and the lead 28 is slightly positive, the amplifier A1 is de-activated and the amplifier A2 is activated. With no voltage applied to section 16 at the input No. 2, the current in section 16 is low and the common cathode voltage is near ground potential. The resulting bias on section 20 produces an increase in current in section 20 and a high voltage drop across the common load resistor 27. The large voltage drop across resistor 27 lowers the potential applied to the control grid of amplifier A3 to its cut off value and no current is drawn by the amplifier. Hence there is no voltage drop across the load resistor 30 and zero voltage appears at the output terminals of the apparatus.

Although the circuit shown in Fig. 3 illustrates the use of D. C. coupled amplifiers, it will be apparent that A. C. coupled amplifiers may be employed in case it is desired to employ A. C. signals at the input and output circuits of the apparatus. Also, it will be apparent that more than two input circuits may be employed if a separate amplifier is provided for each input circuit, with the amplifiers being coupled to a common output circuit and arranged so that only one amplifier is activated at a time.

I claim:

1. Electronic switching apparatus comprising two sets of input terminals, a pair of amplifiers having a common output circuit, two resistors having substantially equal resistance with one resistor being connected in series between one set of input terminals and the input circuit of one of the amplifiers and the other resistor being connected in series between the other set of input terminals and the input circuit of the other amplifier, feedback means including two additional resistors having substantially the same resistance as the first two resistors and respectively connected between said common output circuit and the respective junctions between the first two resistors and the input circuits of the amplifiers for providing substantially 100% negative feedback, and control means coupled to the two amplifiers for selectively activating one of the amplifiers and de-activating the other amplifier to cause the signal produced at the common output circuit to be substantially equal to the signal which is applied to the input circuit of the amplifier which is activated.

2. Electronic switching apparatus for selectively responding to any one of a plurality of separate input signals and providing corresponding output signals which are substantially equal quantitatively to the selected input signals comprising a plurality of separate input circuits each having a series resistance, a common output circuit, a plurality of D. C. amplifiers coupling the input circuits to the output circuit, means for selectively activating the amplifiers, and means for causing the apparatus to have an overall amplification substantially equal to one, including a negative feedback circuit coupled between the output circuit and the input circuits, said negative feedback circuit having a series resistance coupled to each series resistance input circuit to provide a resistive adding circuit combining feedback and input signals.

References Cited in the file of this patent

UNITED STATES PATENTS

| | | |
|---|---|---|
| 2,300,999 | Williams | Nov. 3, 1942 |
| 2,464,353 | Smith et al. | Mar. 15, 1949 |
| 2,482,759 | Goodrich et al. | Sept. 27, 1949 |
| 2,572,792 | White | Oct. 23, 1951 |
| 2,775,696 | Thomas | Dec. 25, 1956 |